Figure 1:
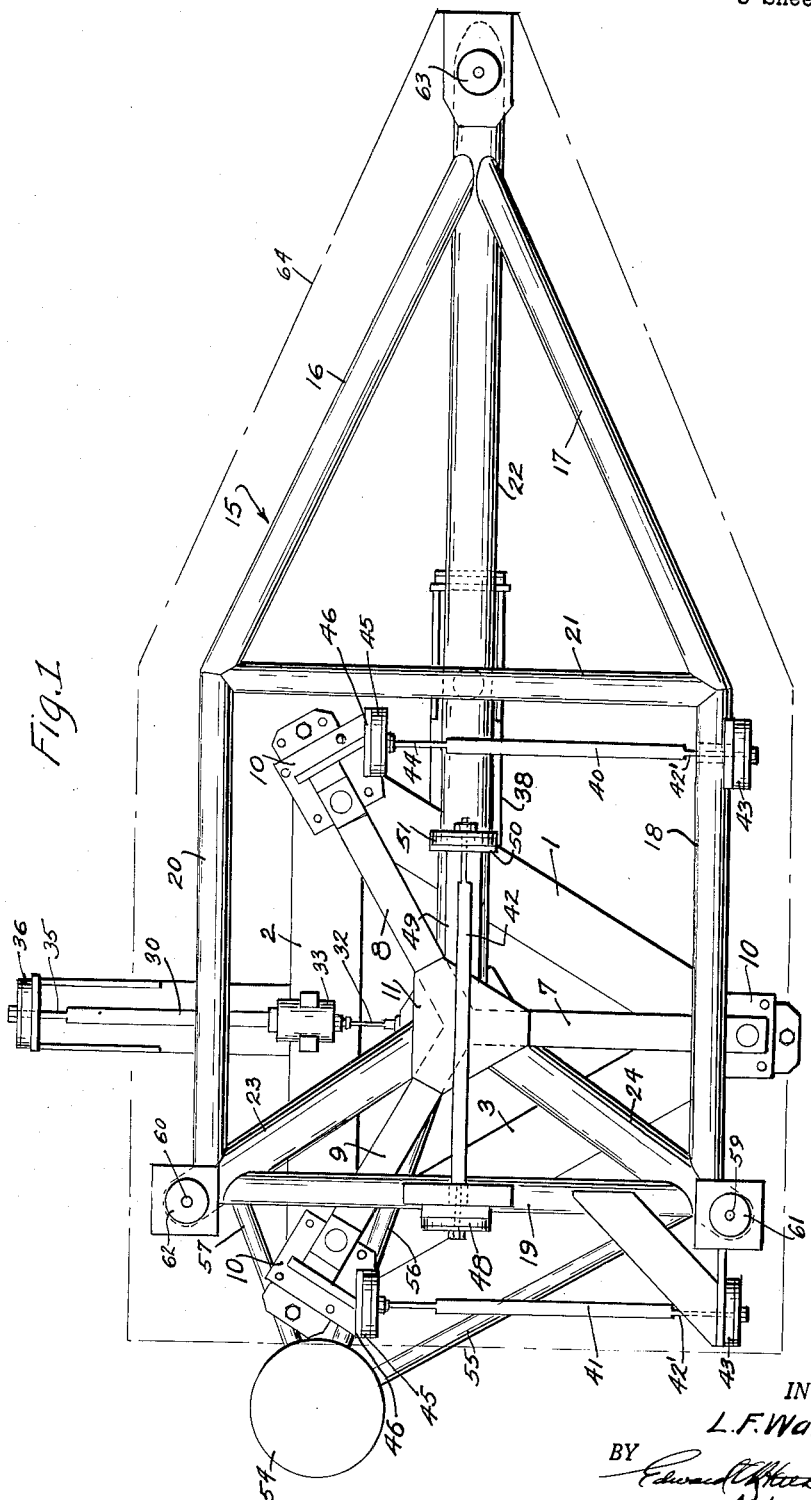

April 19, 1966  LA VERNE F. WALLACE  3,246,506
WEIGHT MEASURING AND CENTER OF GRAVITY LOCATING APPARATUS
Filed Feb. 11, 1963  5 Sheets-Sheet 1

INVENTOR.
L. F. Wallace
BY
Attorney

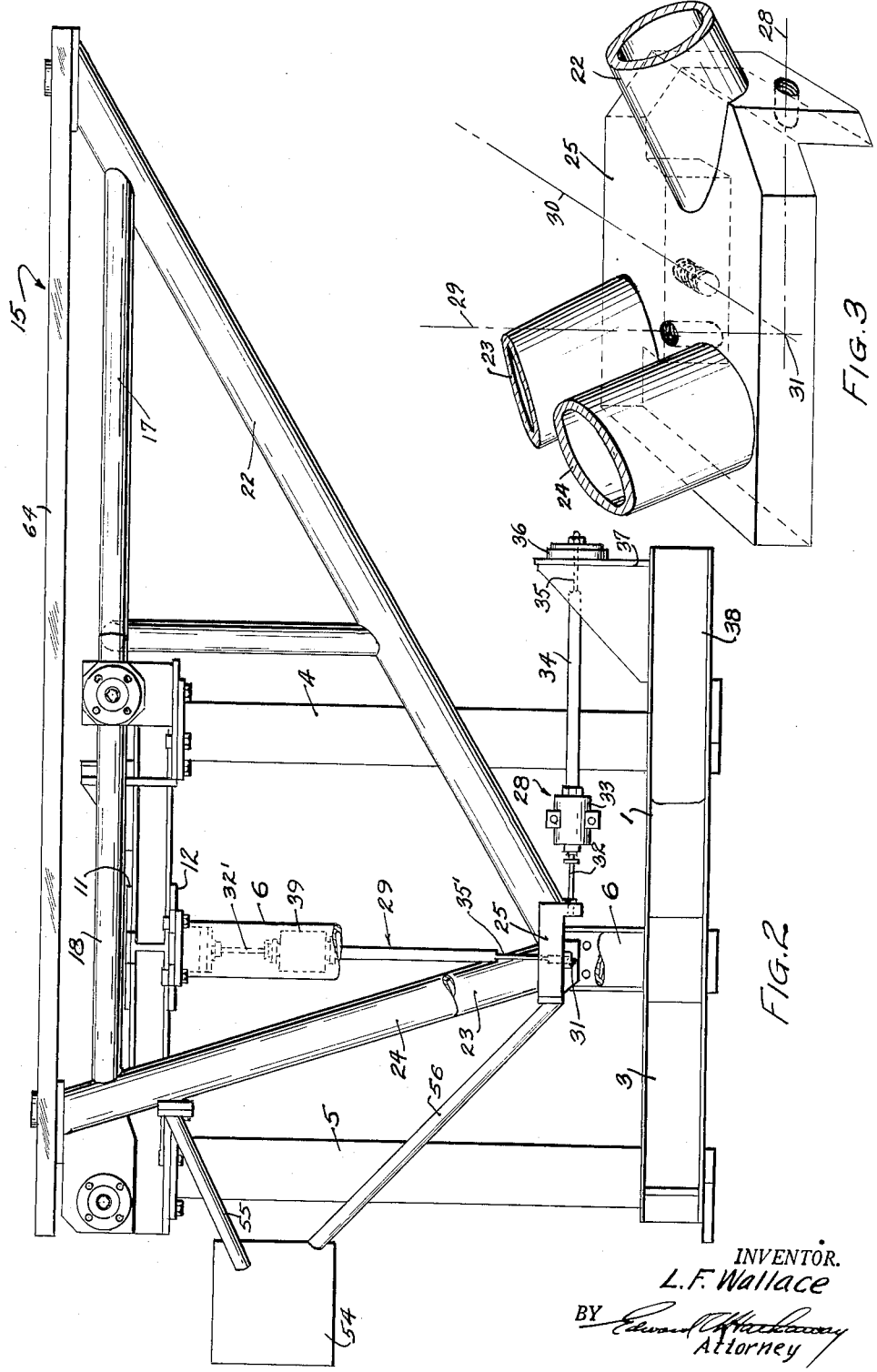

April 19, 1966 LA VERNE F. WALLACE 3,246,506
WEIGHT MEASURING AND CENTER OF GRAVITY LOCATING APPARATUS
Filed Feb. 11, 1963 5 Sheets-Sheet 3
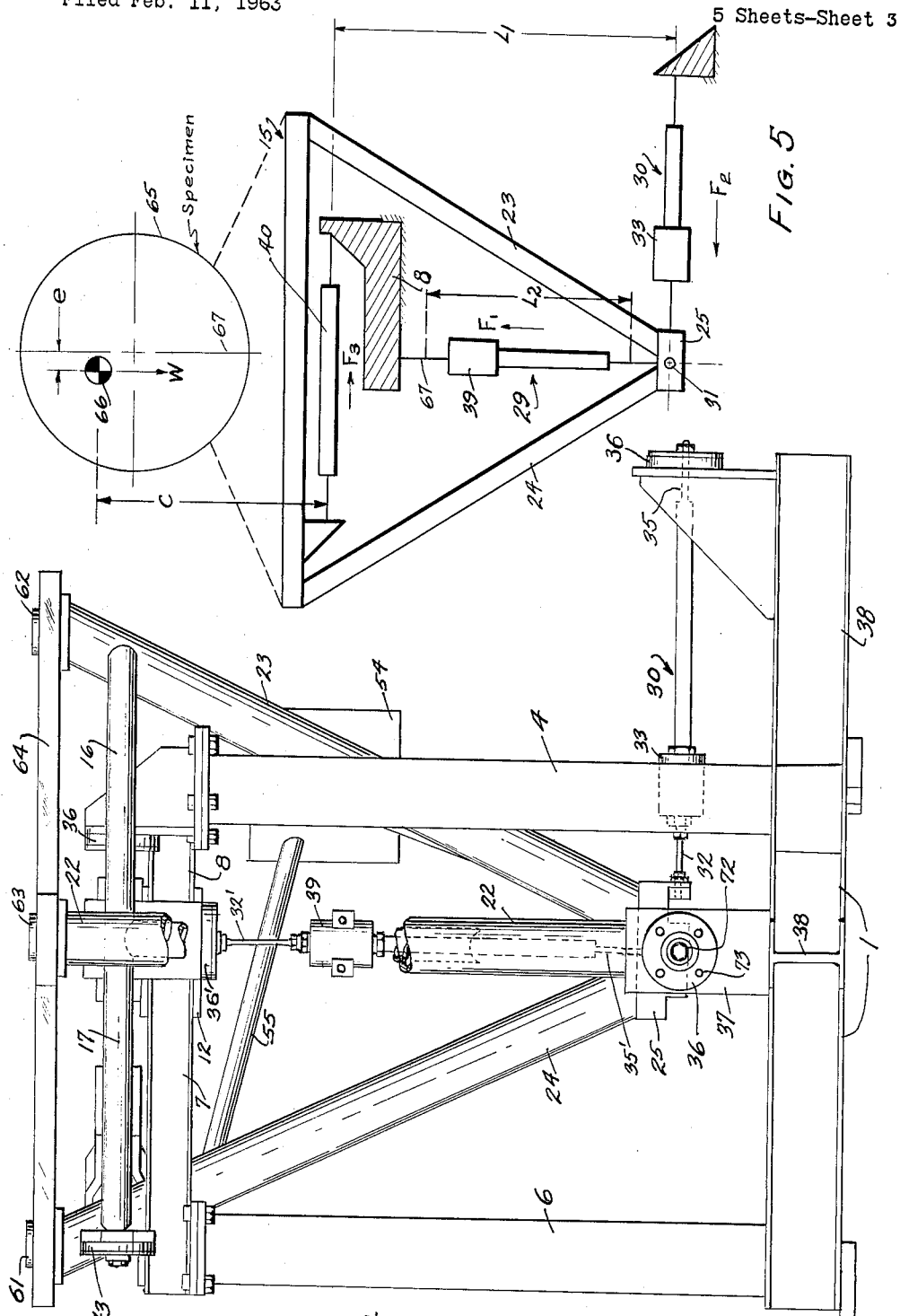
Inventor
L. F. Wallace
By
Attorney

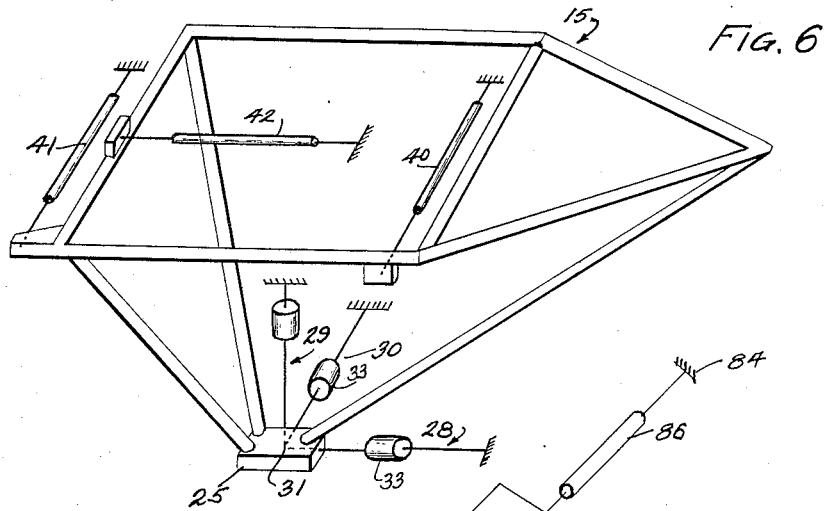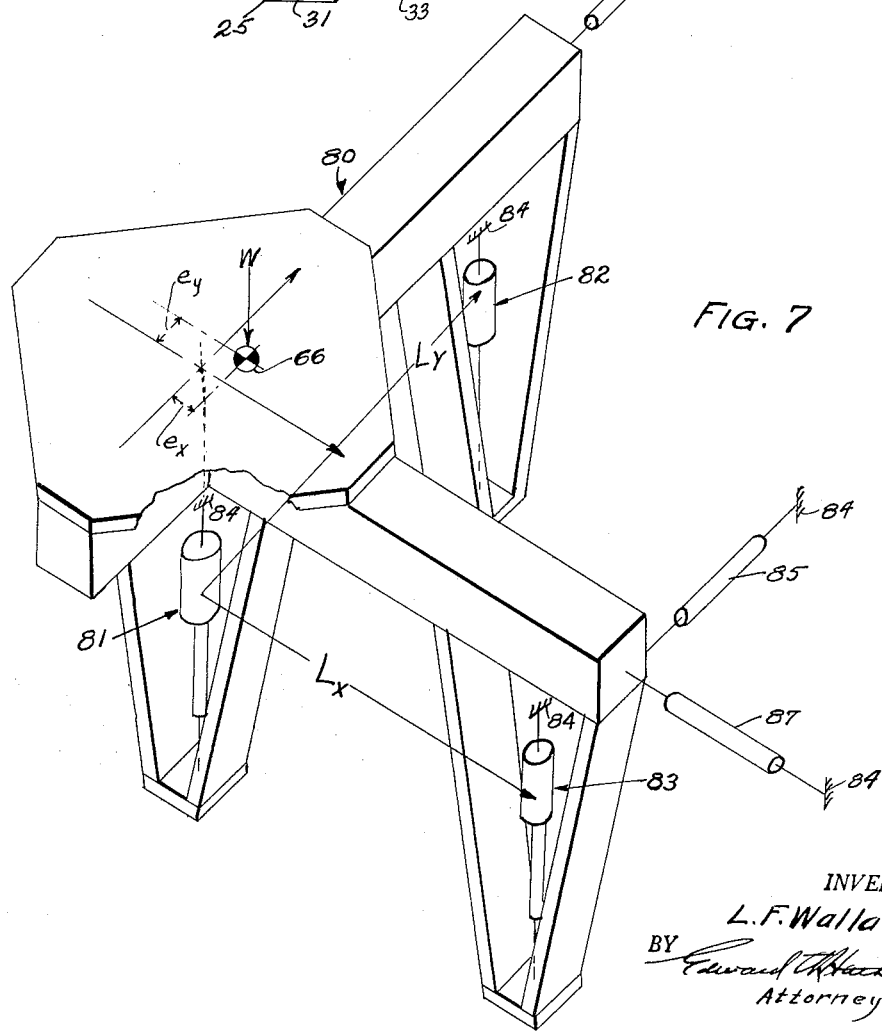

April 19, 1966 LA VERNE F. WALLACE 3,246,506
WEIGHT MEASURING AND CENTER OF GRAVITY LOCATING APPARATUS
Filed Feb. 11, 1963 5 Sheets-Sheet 5
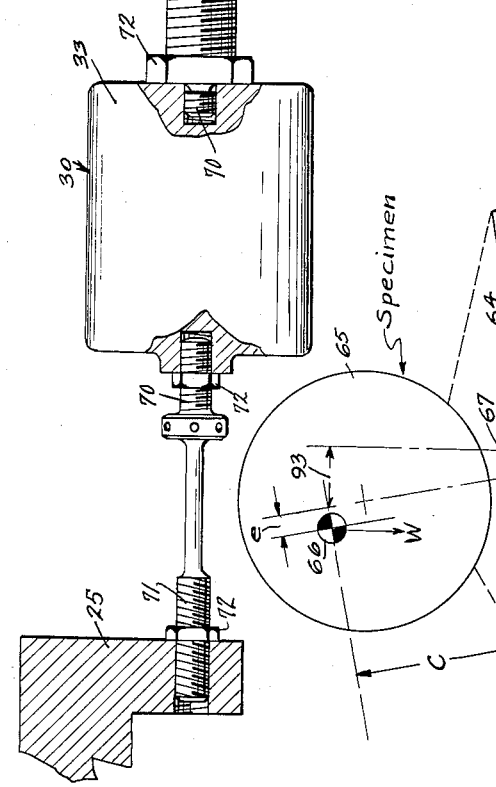
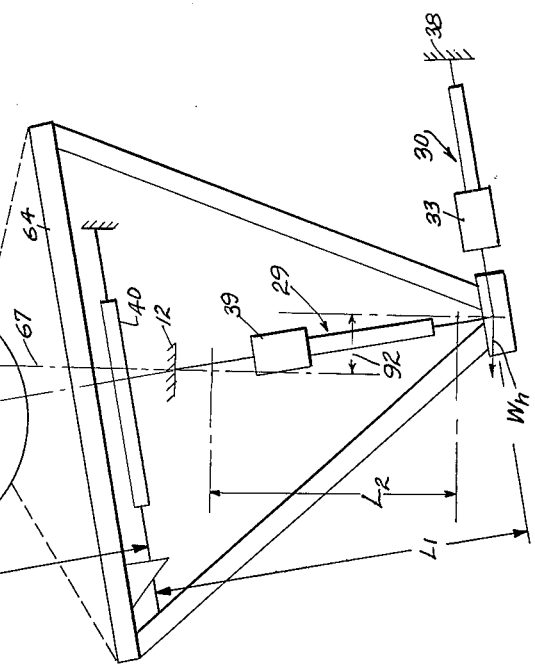
INVENTOR.
*L.F. Wallace*
BY
*Attorney*

United States Patent Office 3,246,506
Patented Apr. 19, 1966

3,246,506
WEIGHT MEASURING AND CENTER OF GRAVITY LOCATING APPARATUS
La Verne F. Wallace, Ashland, Mass., assignor to Baldwin-Lima-Hamilton Corporation, a corporation of Pennsylvania
Filed Feb. 11, 1963, Ser. No. 257,522
9 Claims. (Cl. 73—65)

This invention relates generally to a weighing and center of gravity locating device of the type employing load responsive means, preferably electrical strain gage load cells.

In measuring devices of this general type, the weight is measured by the mv./v. (millivolt per volt) output of one load cell and the center of gravity is measured by taking the quotient of two similar cell outputs. Various types of such systems have been heretofore used, but they have had certain functional or structural limitations, particularly in connection with handling a variety of weights and configurations.

One object of my invention is to provide an improved system for measuring weight and center of gravity location whose errors are substantially independent of weight and center of gravity location of the object being tested.

A further object is to provide such an improved system that is relatively simple, considering its complexity of interrelated functions, and has a high degree of accuracy and sensitivity combined with relative ease of operation and ruggedness.

It is customary in measuring the center of gravity of a specimen, which may be any of one of many types of structures, to utilize a platform supported in a simple manner by three or four compression type load measuring cells. If the load cells are spaced apart a great distance with respect to the expected eccentricity, poor center of gravity sensitivity is the result. If the same cells are placed relatively close together it has been found that errors are caused by the whole platform tipping when one cell "sees" more load than another due to the normal cell deflections. To avoid these problems it has heretofore been suggested to place a single compression cell at the center of the specimen platform and to place two tension-compression load cells, of lower capacity, displaced from the center and at 90° to each other, thus accomplishing what is considered to be good determination of the center of gravity, as well as limiting tipping errors. One complexity resulting from this arrangement, required the three reactions to be added to get the specimen weight.

A further evolution in this type of equipment was to place the lower capacity cells in a horizontal attitude and displace them vertically from a set of stay rods. In this particular configuration errors arose due to the internal deflections of the load cell assembly and stay rods.

In my improved arrangements I employ a combination of elements including a single weight responsive load cell in tension, thereby eliminating the majority of the errors caused by internal misalignment.

Other objects and advantages will be more apparent to those skilled in the art from the following description of the accompanying drawings in which:

FIG. 1 is a plan view of my improved apparatus;
FIG. 2 is a side elevation of the apparatus;
FIG. 3 is an enlarged fragmentary perspective view of the pivot block of a floating table of my apparatus;
FIG. 4 is an end view of FIGS. 1 and 2 looking toward the left at the right hand end thereof;
FIG. 5 is a two dimensional schematic force diagram of my apparatus shown in association with a specimen having an eccentric center of gravity;
FIG. 6 is a diagrammatic illustration of my apparatus with its stabilizing flexure assemblies and with the force measuring struts for determining both the weight of a specimen and the extent of eccentricity of the center of gravity of the specimen;
FIG. 7 is a diagrammatic illustration of a modified arrangement of the force measuring means in my apparatus;
FIG. 8 is an enlarged partially sectional view of one of the force measuring flexure assemblies; and
FIG. 9 is a diagram similar to FIG. 5 but shown in a grossly distorted loaded condition to clearly illustrate the principles involved, the specimen being a part of this figure.

The preferred embodiment of my improved apparatus comprises a stationary base structure including a triangular arrangement, FIG. 1, of horizontal structural members, preferably I-beams, 1, 2 and 3 suitably secured together as by welding. Base frame columns 4, 5 and 6, FIG. 2, welded to the vertices of the base triangle, carry at their top a spider frame consisting of three structural members, preferably I-beams 7, 8 and 9. The outer ends of these I-beams are bolted or otherwise suitably connected to plates 10 which are bolted to the columns. The inner ends of the spider beams are joined together at the center by upper and lower plates 11 and 12.

Mounted upon the stationary base structure is a floating table frame generally indicated at 15. This frame includes a series of members, preferably steel pipes, 16, 17, 18, 19, 20 and 21. The ends of member 21 are connected, preferably by welding, to the outside frame members 16, 17, 18 and 20, while the outer ends of the members 16 and 17 are welded to a larger diagonally extending pipe 22. One of the ends of members 19 and 20 are connected to another diagonal pipe member 23, and similarly pipes 18 and 19 are connected to a diagonal pipe member 24. These three diagonal members converge and are welded to a pivot block 25, FIG. 3, of the floating frame. This frame is supported by a combination of three force measuring strut assemblies and three stay rods. The force measuring struts are longitudinal as at 28, vertical as at 29, and lateral as at 30, FIG. 4. The axes of these three struts preferably converge at a common point 31 in the block structure 25. More specifically, the longitudinal strut assembly 28 includes a short flexure element 32 preferably threadedly connected at one end to a flange of block 25 while the other end is threaded to one end of a load cell 33. This load cell, as well as the other two to be described, can be any suitable type of force measuring transducer but for purposes of illustration it is preferably of the electrical load responsive type such as shown for example in Patent No. 2,561,318. The other end of this load cell is threadedly connected to a rigid section 34 of a long flexure assembly having a flexure portion 35 secured to a mounting flange 36. This flange is supported against a suitable mounting bracket 37 secured to an I-beam 38 which extends out from and is an integral part of I-beam 1 of the triangular base. The lateral force measuring strut 30, FIG. 4, is identical in every respect to strut 28 both in construction and the manner of being connected to the block 25 and to the triangular base. The same reference numbers are, therefore, used for similar parts. The vertical weight measuring strut 29, FIGS. 2 and 4, is also constructed similarly to strut 28 except that it is somewhat longer. It has a long flexure portion 35' connected to the block 25 and its short flexure element 32' connected to a mounting flange 36' which is made a part of the base frame as by being bolted to the lower gusset plate 12 of the spider frame 7, 8 and 9. By having the long flexure portion 35' connected to the block 25, it is possible to locate the vertical load cell 39 in the upper area of the floating frame where there is ample room for access.

The stay rods consist, FIG. 1, of two lateral members 40 and 41 and a longitudinal member 42. The member 40 has its flexure section 42' connected to a mounting flange 43 which is bolted to the member 18 of the floating frame, while the flexure section 44 has a mounting flange 45 bolted to a vertical bracket 46 extending upwardly from the plate 10. The stay rod 41 is similarly connected to the floating frame and base frame and hence carry the same reference numbers. The longitudinal stay rod 42 has a mounting flange 48 connected to the member 19 of the floating frame while its other end is connected to a mounting flange 51 which in turn is connected to an I-beam 49 extending outwardly from the gusset plates 11 and 12 by virtue of a vertical bracket plate 50. These stay rods perform the functions of imparting two-directional lateral stability to the table and stability against rotation of the table about its normally vertical axis.

Because the floating frame 15 has an extended portion 16, 17 and 22 there is a certain degree of unbalance of the floating frame about the center reference point 31. To prevent this unbalance from producing a tare load in the small horizontal load cell 33, I provide a counterbalance weight 54 supported by elements 55, 56 and 57. Element 56 is connected to block 25 while element 55 is attached to strut 24, and element 57 is attached to strut 23 near its upper end.

As is well known in center of gravity measuring devices, it is necessary to have very precise reference points with respect to the normally vertical measuring axis which passes through point 31. In my improved apparatus these points are vertical holes 59 and 60 formed in pads 61 and 62 which are secured as by welding to the upper ends of struts 23 and 24. A supporting pad 63 is mounted on the outer end of strut 22. This pad does not enter into the precise location of the article or specimen whose center of gravity is to be determined. A suitable work table 64, FIGS. 2 and 4 (but removed from FIG. 1) is mounted on the floating frame as by having openings large enough through which the pads 61, 62 and 63 may extend. It should be understood, however, that the specimen or article whose center of gravity is to be determined is not supported on this table but rather is supported on the pads 61–63. No tools, etc. would be left on the work table 64 during the measuring operation.

It should be mentioned that the two horizontal load cells 33, 33 are responsive either to tension or compression forces, while the load cell 39 is responsive only to tension forces arising from the specimen weight. The stay rods 40, 41 and 42, will resist either tension or compression forces tending to unstabilize the floating frame.

To calibrate this apparatus a suitable fixture may be mounted on the pads 61, 62 and 63 precisely positioned between holes 59 and 60. Weights can then be precisely placed in desired positions on the fixture.

The operation of this apparatus is diagrammatically illustrated in FIGS. 5 and 9. A specimen 65 is positioned in the holes 59 and 60 which are located equal distances from an axis 67 that is normally vertical when the frame is in its untilted position, said axis passing through the reference point 31. The specimen is assumed to have a center of gravity at a point indicated by the well-known center of gravity symbol 66. This center of gravity is a distance $e$ from the geometrical center of the specimen and it is this distance which is to be measured. The weight W is represented in load cell 39 by $F_1$ and the eccentricity $e$ of this weight is resisted in the flexure members 40 and 41 as represented by the force $F_3$. The eccentric force is measured in load cell 33 of the measuring strut 30. The eccentricity $e$ causes an overturning moment which is restrained by equal and opposite force $F_2$ and $F_3$ in said latter load cell 33 and stay rods 40 and 41 respectively. Inasmuch as the purpose of this apparatus is to determine the value of eccentricity $e$ it will be understood that the following equation would be used:

$$W = F_1$$

$$e = \frac{F_2 \times L_1}{W} = \frac{F_2 \times L_1}{F_1}$$

$L_1$ = the vertical distance between a horizontal plane commonly containing the axes of the horizontal stay rods 40, 41 and 42, and a parallel plane commonly containing the axes of horizontal load cell struts 28 and 30.

From the foregoing disclosure it is seen that I have provided a very effective weighing and center of gravity locating device that is extremely rugged, that is relatively economical to manufacture for a piece of equipment of this scientific type, and that has a high degree of sensitivity and accuracy combined with ease of operation and maintenance. Also, it is possible to readily change the capacity of the apparatus merely by substituting load cells in the strut assemblies of other capacities. The apparatus may be readily aligned with great precision during its calibration by reason of the threaded ends of these load cell and stay rod assemblies having (FIG. 8) right and left hand threads 70 and 71 respectively so that by merely rotating any individual assembly, it is possible to shift the floating frame to its precise position. Lock nuts 72 can then be tightened on each of the threaded members. The mounting flanges such as 36, etc., for the various load cell struts and stay rod assemblies can be shifted radially with respect to their axis by reason of having large clearance holes through which mounting studs such as 73 pass. Thus, I am able to provide lengthwise adjustments of the strut assemblies and lateral adjustments of their axes and still insure that all of these adjustments will maintain a fixed relation of the various axes to the preferred reference point 31.

In the modification of FIG. 7, the floating frame 80 is supported by a vertical weight measuring load cell flexure assembly 81 and vertical center of gravity load cell flexure assemblies 82 and 83, all fixed at one of their ends to a stationary frame diagrammatically indicated at 84. Lateral stabilizing flexures 85 and 86 and a longitudinal flexure 87 guides the floating frame during the extremely minute deformation of the load cells.

A specimen being tested in FIG. 7, would be placed in a holding fixture which in turn would be placed on the top surface of floating table. The holding fixture would be accurately positioned by use of dowel pins in the fixture and dowel pin holes in the floating table as previously described in the preferred form of my invention. The center of gravity of a specimen would be first reasonably estimated by the eye of an operator or roughly calculated, for safety of the apparatus, and this center would be positioned directly over the weight cell 81 when the specimen is installed in the holding fixture on the floating table. As the actual center of gravity of the specimen may deviate from the estimated center a misalignment of the specimen weight vector and the weight cell force occurs. This misalignment would then result in an overturning moment equal to the product of the specimen weight (W) and the center of gravity eccentricity ($e$). The specimen center of gravity eccentricity can be resolved into two components $e_x$ and $e_y$. The resulting overturning moments ($We_x$ and $We_y$) are restrained by forces in the two center of gravity measuring cells 82 and 83. The forces in the center of gravity cells can be expressed as follows:

$$F_x = \frac{We_x}{L_x}$$

where $L_x$ is the horizontal dimension between the weight cell 81 and the center of gravity cell 82. Similarly $$F_x = \frac{We_y}{L_y}$$

The speciment weight can be determined by the total loads in the three cells. Knowing W, $L_x$ or $L_y$ and $F_x$ or $F_y$ it is then possible to calculate $e_x$ or $e_y$ as follows:

$$e_x = \frac{L_x F_x}{W} \qquad e_y = \frac{L_y F_y}{W}$$

In both modifications I have used the same techniques of eliminating the effects of two major errors which exist in a reaction measuring system of this nature. The technique is shown as follows:

FIG. 5 shows the force measuring system in two dimensions only with the system in its unloaded condition in which everything is in "a neutral state" and therefore in perfect alignment, i.e. the horizontal surface of the table at right angles to a vertical line which is the line of gravity.

In considering the first major error, it will be understood that as the system becomes loaded with the eccentric position of the center of gravity of the specimen there are deflections in the flexure stay rods and in the horizontal center of gravity cell strut which causes the floating table 15 to become misaligned (tilted) thus causing errors as shown in FIG. 9. In an actual case the vertical and inclined axes of the floating table frame need not intersect at the ground supporting point of the vertical force measuring means 29 as shown in FIG. 9. This is not an important design criteria. This tilting is so extremely small as to be almost infinitesimal and therefore the cosine of the tilting angles can be assumed to be 1. Once the misalignment (tilting) occurs the specimen center of gravity is moved to a still further degree of eccentricity 93, FIG. 9 and consequently additional force is present in the center of gravity cell. This further degree of movement shall be designated as a misalignment error about the point of intersection between the vertical and inclined axes of the table, and can be calculated by the following equation:

$$\text{Misalignment error} = We\left(\frac{C+L_1}{L_1^2 K_2} + \frac{C+L_1}{L_1 K_3} - \frac{1}{L_1 K_2}\right)$$

$W$ = Specimen weight
$e$ = Specimen center of gravity (C.G.)
$C$ = The vertical distance from the stay rod to the specimen nominal C.G.
$L_1$ = Vertical distance between the stay rod and the C.G. cell
$K_2$ = The axial spring constant of the C.G. cell strut
$K_3$ = The axial spring constant of the stay rod The foregoing is a compression error in the center of gravity cell 33 of the force measuring strut 30 in FIG. 9.

The second major error occurs at the same time the floating table is being misaligned because the weight cell strut 29 is also being misaligned as shown in FIG. 9. The weight cell lateral misalignment 92, FIG. 9 causes a horizontal component of force $W_h$, which is important to the center of gravity cell 33 of strut 30. This force is shown in the following equation:

$$W_h = \frac{We \times W}{L_1 K_2 L_2} = \text{Horizontal component of weight force}$$

$W_h$ = Horizontal component of the weight cell strut force.
$L_2$ = The length of the weight cell strut, i.e. the distance between the centers of the flexure positions 32' and 35'.

If we insert this horizontal component force into the C.G. equation, the C.G. error caused by this force may be calculated.

$$\text{C.G. error} = \frac{W_h L_1}{W} = \frac{W^2 e L_1}{L_1 L_2 K_2 W_2}$$

$$\text{C.G. error} = \frac{We}{L_2 K_2}$$

The foregoing is a tension error.

The tension error and compression error are equated below in Equation 1. The common factor $We$ has been cancelled from Equation 1 thus leaving Equation 2 which describes the geometry of the system in which the two major errors cancel.

Equation 1

$$We\frac{1}{L_2 K_2} = We\left(\frac{C+L_1}{L_1^2 K_2} + \frac{C+L_1}{L_1^2 K_2} - \frac{1}{L_1 K_2}\right)$$

Equation 2

$$\frac{1}{L_2 K_2} = \left(\frac{C+L_1}{L_1^2 K_2} + \frac{C+L_1}{L_1^2 K_3} - \frac{1}{L_1 K_2}\right)$$

With reference to FIG. 5, my device has a "normally vertical axis defined by 29, 39, etc. in the "normal" position when $e=0$ both in the plane of the paper and at right angles thereto. I define the "eccentric moment" of the specimen to be the product $We$ where $e$ is the eccentricity of the center of gravity of W relative to the "normally vertical" axis. If there is also eccentricity in the vertical plane normal to the paper there will be a similar "eccentric moment" in that plane. Responsive means 33 of link 28 measures $We$ in the plane of the paper, while a similar element 33 of link 30, FIG. 6 at right angles to the paper measures the eccentric moment in the other plane the total eccentric moment is of course $$W\sqrt{e_x^2 + e_y^2}$$

(see FIG. 7), where $e_x$ and $e_y$ are the eccentricities in the two normal vertical planes.

Now since there are small but measurable strains produced in such members as 40, 30, 33 when $e \neq 0$ it will be seen that the "normally vertical" axis of 39 will be tilted whenever any eccentricity exists. In prior art devices this inevitable tilting gave rise to errors in the measurement of $We$ due to the resultant non-linearity of the system. That is, a large W and small $e$ would not give the same reading as a small W and large $e$ even through $We$ was the same.

The devices shown in FIGS. 5 and 7 as examples of my invention are so devised that this prior art problem is solved in a unique manner. Again referring to FIG. 5 for simplicity, the weight W will cause the table 15 to tilt counter-clockwise and similarly 29, 30 will also be tilt counter-clockwise. This is shown very much exaggerated in FIG. 9. Since I have placed 29, 39 in tension, the result of such tilting will be to produce a leftward acting horizontal component of force at the bottom of the frame. It is seen that this component tends to resist the tilting action and therefore reduces the force that 33 would otherwise have to carry. I have discovered and proved by actual tests that it is possible to so select the dimensions and other design parameters that the force measured by 33 will be directly a measure of $We$ substantially independent of the relative magnitude of W and $e$. Furthermore the force measured by 33 in my invention is substantially the same as the force that would exist in 33 of FIG. 5 if the elements 40, 33, 30 were so rigid axially as to allow no tilting whatever.

It will, of course, be understood that varous changes in details of construction and arrangement of parts may be made by those skilled in the art without departing from the spirit of the invention as set forth in the appended claims.

I claim:
1. Apparatus for determining the weight and center of gravity of a specimen comprising, in combination,
   (A) a substantially rigid floating frame having a table, with a normally vertical axis, for supporting the specimen the weight of which produces
       (1) a vertical weight force component along the normally vertical axis,
           (a) the specimen, when supported on the table with its center of gravity eccentrically located with respect to said normally vertical axis, producing

(1) eccentric moment components of force which tilt the table so that its said normally vertical axis is inclined to the normally vertical axis of the untilted table, (2) the tilting of the table thereby producing an additional eccentricity of the center of gravity with respect to said normally vertical axis of the untilted table, (B) a base, (C) tension force weight responsive means supported by said base and
(1) supporting said frame on said base in tension in direction of said normally vertical axis and
(2) allowing the table to tilt so that its normally vertical axis becomes inclined in response to a component of force arising from the eccentric center of gravity of the specimen,
    (a) said tilting of the table causing the tension force responsive means to produce a horizontal component of force acting on said frame to partially resist the horizontal components of force which create said tilting, (D) a plurality of horizontally acting stay means operatively connected to frame and said base to provide two-directional lateral stability to the table and stability against rotation of the table about said normally vertical axis, (E) and a plurality of horizontally-disposed eccentric moment measuring means operatively connected to said frame and said base so that the tension force weight responsive means measures the total weight of the specimen and said moment measuring means being responsive to and opposing the remaining portion of components of force tending to tilt the table, (F) whereby if the center of gravity of the specimen is so located as to produce said tilting action the said component of force of the tension force responsive means tending to resist said tilting is of such magnitude and direction as to cause said remaining components of force to be substantially the same as if no tilting action existed, thereby making the sensitivity of said eccentric moment measuring means substantially independent of the tilting of said table so that the actual eccentricity of the specimen can be determined.

2. Apparatus for determining the weight and center of gravity of a specimen comprising, in combination, (A) a substantially rigid floating frame having a table, with a normally vertical axis, for supporting the specimen to the weight of which produces
(1) a vertical weight force component along the normally vertical axis,
    (a) the specimen, when supported on the table with its center of gravity eccentrically located with respect to said normally vertical axis, producing
        (1) eccentric moment components of force which tilt the table so that its said normally vertical axis is inclined to the normally vertical axis of the untilted table,
        (2) the tilting of the table thereby producing an additional eccentricity of the center of gravity with respect to said normally vertical axis of the untilted table, (B) a base, (C) tension force weight responsive means supported by said base and
(1) supporting said frame on said base in tension in direction of said normally vertical axis and
(2) allowing the table to tilt so that its normally vertical axis becomes inclined in response to a compartment of force arising from the eccentric center of gravity of the specimen.
    (a) said tilting of the table causing the tension force responsive means to produce a horizontal component of force acting on said frame to partially resist the horizontal components of force which create said tilting, (D) a plurality of horizontally acting stay means operatively connected to said frame and said base to provide two-directional lateral stability to the table and stability against rotation of the table about said normally vertical axis, (E) and a plurality of horizontally-disposed eccentric moment measuring means having their axes lying in vertical planes which are at an angle to each other and operatively connected to said frame and said base and being responsive to and opposing the remaining portion of components of force tending to tilt the table, (F) whereby if the center of gravity of the specimen is so located as to produce said tilting action the said component of force of the tension force responsive means tending to resist said tilting is of such magnitude and direction as to cause said remaining components of force to be substantially the same as if no tilting action existed, thereby making the sensitivity of said eccentric moment measuring means substantially independent of the tilting of said table so that the actual eccentricity of the specimen can be determined.

3. The combination set forth in claim 2 further characterized in that the plurality of the eccentric moment measuring means are disposed horizontally with their axes lying in a common horizontal plane.

4. The combination set forth in claim 2 further characterized in that the plurality of eccentric moment measuring means are disposed substantially horizontally in a common plane and with their axes substantially at right angles to each other.

5. The combination set forth in claim 2 further characterized in that the tension force responsive measuring means and eccentric moment measuring means have their axes intersecting substantially at a common point on the frame.

6. The combination set forth in claim 2 further characterized in that the plurality of eccentric moment measuring means are disposed substantially horizontally in a common plane with their axes substantially at right angles to each other and, said stay means being three in number with two thereof substantially parallel to one of said eccentric moment measuring means and the third substantially parallel to the other of said eccentric moment measuring means.

7. Apparatus for determining weight and center of gravity of an object, comprising in combination:

(A) a substantially rigid frame adapted to support and position an object, said frame having an axis which is normally substantially vertical, (B) a base, (C) weight-responsive means supporting said frame on said base in tension, said means being connected to said frame at a point on said axis,
(1) means including flexible weight-carrying portions connected between said frame and said base allowing said frame to tilt in relation to said base in response to a component of tilting moment arising from the horizontal eccentric displacement of the center of gravity of the object relative to said axis,
    (a) the tilting of said frame thereby causing the horizontal eccentricity of said center of gravity relative to the untilted position of said axis to be greater than said horizontal eccentric displacement and in the same direction,
    (b) the tilting of said frame causing said weight-responsive means to tilt in the same direction, thereby to exert a substantially horizontal component of force upon said frame tending to resist the tilting,
(D) a plurality of flexible stay means connected between said frame and said base stabilizing said frame laterally in relation to a vertical axis and against rotation about a vertical axis while permitting at least limited rotation about at least one horizontal axis and substantially free movement along said vertical axis,
(E) eccentric moment-measuring means connected between said frame and said base and responsive to and opposing components of force which the object develops in tending to cause tilting rotation of said frame about said horizontal axis,
    (1) said horizontal component of force exerted by said weight-responsive means being of magnitude and direction tending to counteract the error produced in the eccentric moment-measuring means as the result of difference between said horizontal eccentricity and said horizontal eccentric displacement,
    (2) whereby, the ratio of responsive of said eccentric moment-measuring means to the response of said weight-responsive means is directly related to the horizontal location of the center of gravity of the object laterally in relation to said substantially vertical axis.

8. Apparatus for determining weight and center of gravity of an object as set forth in claim 7, wherein said flexible stay means are connected between said frame and said base to permit at least limited rotation of said frame about two mutually-perpendicular horizontal axes, wherein said eccentric moment-measuring means comprises two moment-measuring means each separately responsive to and opposing a different one of two components of force which the object develops in tending to cause tilting rotation of said frame about said two mutually-perpendicular horizontal axes, and wherein said moment-measuring means and weight-responsive means comprise load cells producing electrical output signals, whereby the ratios of electrical output signals from each of said moment-measuring means to the electrical output signals from said weight-responsive means are each directly related to the horizontal locations of the center of gravity of the object laterally in relation to said substantially vertical axis.

9. Apparatus for determining weight and center of gravity of an object as set forth in claim 7, wherein said horizontal component of force produced in the eccentric moment-measuring means by said weight-responsive means is of substantially the same magnitude as and of opposite direction to the force produced in the eccentric moment-measuring means as the result of difference between said horizontal eccentricity and said horizontal eccentric displacement.

References Cited by the Examiner
UNITED STATES PATENTS

| | | | |
|---|---|---|---|
| 2,336,142 | 12/1943 | Watson | 73—65 |
| 2,410,653 | 11/1946 | Hem | 73—65 |
| 2,410,654 | 11/1946 | Hem | 73—65 |
| 2,430,702 | 11/1947 | Bohannan | 73—65 |
| 2,947,175 | 8/1960 | King et al. | 73—483 |
| 3,148,546 | 9/1964 | Karig | 73—486 |

RICHARD C. QUEISSER, *Primary Examiner.*

JOSEPH P. STRIZAK, *Examiner.*

LOUIS MOK, J. JOSEPH SMITH, JR.,
                                  *Assistant Examiners.*